United States Patent
Krompass et al.

(10) Patent No.: US 9,910,892 B2
(45) Date of Patent: Mar. 6, 2018

(54) MANAGING EXECUTION OF DATABASE QUERIES

(75) Inventors: Stefan Krompass, Garching (DE); Harumi Anne Kuno, Cupertino, CA (US); Umeshwar Dayal, Saratoga, CA (US); Janet Lynn Wiener, Palo Alto, CA (US); Raja Sambasivan, Ossining, NY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1241 days.

(21) Appl. No.: 12/242,637

(22) Filed: Sep. 30, 2008

(65) Prior Publication Data

US 2010/0082603 A1 Apr. 1, 2010
US 2017/0316054 A9 Nov. 2, 2017

Related U.S. Application Data

(60) Provisional application No. 61/078,382, filed on Jul. 5, 2008.

(51) Int. Cl.
*G06F 17/30* (2006.01)
(52) U.S. Cl.
CPC .............. *G06F 17/30463* (2013.01)
(58) Field of Classification Search
USPC .......................................................... 707/719
See application file for complete search history.

(56) References Cited

U.S. PATENT DOCUMENTS

| | | | |
|---|---|---|---|
| 5,819,255 A | 10/1998 | Celis et al. | |
| 5,835,964 A | 11/1998 | Draves et al. | |
| 6,003,022 A | 12/1999 | Eberhard et al. | |
| 6,026,391 A | 2/2000 | Osborn et al. | |
| 6,330,552 B1 | 12/2001 | Farrar et al. | |
| 6,799,175 B2 | 9/2004 | Aggarwal | |
| 6,865,567 B1 | 3/2005 | Oommen et al. | |
| 7,031,958 B2 | 4/2006 | Santosuosso | |
| 7,146,363 B2 | 12/2006 | Waas et al. | |
| 7,356,524 B2 | 4/2008 | Zurek et al. | |
| 7,369,868 B2 | 5/2008 | Dunko et al. | |
| 7,398,191 B1 | 7/2008 | Gluhovsky et al. | |
| 7,493,337 B2 | 2/2009 | Chaudhuri et al. | |
| 7,499,908 B2 | 3/2009 | Einaffar et al. | |
| 7,610,264 B2 | 10/2009 | Ewen et al. | |
| 7,636,735 B2 | 12/2009 | Haas et al. | |
| 7,747,641 B2 | 6/2010 | Kim et al. | |
| 7,831,594 B2 | 11/2010 | Mehta et al. | |
| 7,840,556 B1 | 11/2010 | Dayal et al. | |
| 7,890,491 B1 | 2/2011 | Simmen | |

(Continued)

OTHER PUBLICATIONS

Green et al. (Green), Oracle 9i Performance Tuning Guide and Reference, selected pages, Published Oct. 2002 http://download.oracle.com/docs/cd/B10500_01/server.920/a96533.pdf.*

(Continued)

*Primary Examiner* — Bai D. Vu
(74) *Attorney, Agent, or Firm* — Trop, Pruner & Hu, P.C.

(57) ABSTRACT

One embodiment is a method to manage queries in a database. The method identifies a query that executes on the database for an elapsed time that is greater than a threshold and then implements a remedial action when the query executes on the database for an execution time that is greater than an estimated execution time.

19 Claims, 2 Drawing Sheets

(56) References Cited

U.S. PATENT DOCUMENTS

| | | | |
|---|---|---|---|
| 7,890,496 B2 | 2/2011 | Li et al. | |
| 7,895,192 B2 | 2/2011 | Mehta et al. | |
| 8,108,415 B2 | 1/2012 | Styles | |
| 8,275,762 B2 | 9/2012 | Gupta et al. | |
| 9,189,523 B2 | 11/2015 | Ganapathi et al. | |
| 2002/0147703 A1 | 10/2002 | Yu et al. | |
| 2002/0169772 A1 | 11/2002 | Aggarwal | |
| 2002/0198867 A1 | 12/2002 | Lohman et al. | |
| 2003/0018618 A1 | 1/2003 | Bestgen et al. | |
| 2003/0225563 A1 | 12/2003 | Gonos | |
| 2004/0103793 A1 | 6/2004 | Kurosawa | |
| 2004/0162834 A1 | 8/2004 | Aono et al. | |
| 2004/0225631 A1 | 11/2004 | Elnaffar et al. | |
| 2005/0071331 A1 | 3/2005 | Gao et al. | |
| 2005/0210023 A1 | 9/2005 | Barrera et al. | |
| 2005/0222965 A1 | 10/2005 | Chaudhuri et al. | |
| 2005/0228779 A1 | 10/2005 | Chaudhuri et al. | |
| 2006/0031189 A1 | 2/2006 | Muras et al. | |
| 2006/0074970 A1 | 4/2006 | Narayanan et al. | |
| 2006/0190430 A1* | 8/2006 | Luo et al. | 707/3 |
| 2006/0230006 A1 | 10/2006 | Buscema | |
| 2007/0043696 A1 | 2/2007 | Haas et al. | |
| 2007/0192316 A1 | 8/2007 | Lee et al. | |
| 2007/0217676 A1 | 9/2007 | Grauman et al. | |
| 2007/0226178 A1 | 9/2007 | Ewen et al. | |
| 2007/0250476 A1 | 10/2007 | Krasnik | |
| 2007/0255512 A1 | 11/2007 | Delenstarr et al. | |
| 2008/0027884 A1 | 1/2008 | Boutault | |
| 2008/0154844 A1 | 6/2008 | Gao et al. | |
| 2008/0195577 A1 | 8/2008 | Fan et al. | |
| 2008/0222093 A1 | 9/2008 | Fan et al. | |
| 2008/0253665 A1 | 10/2008 | Mitarai et al. | |
| 2009/0006045 A1 | 1/2009 | Liu et al. | |
| 2009/0006346 A1 | 1/2009 | C N et al. | |
| 2009/0024563 A1 | 1/2009 | Sengar | |
| 2009/0024572 A1 | 1/2009 | Mehta et al. | |
| 2009/0024598 A1 | 1/2009 | Xie et al. | |
| 2009/0063387 A1* | 3/2009 | Beaty et al. | 706/50 |
| 2009/0077013 A1* | 3/2009 | Hu et al. | 707/2 |
| 2009/0106219 A1* | 4/2009 | Belknap | G06F 17/30463 |
| 2009/0319475 A1 | 12/2009 | Bestgen et al. | |
| 2010/0082507 A1 | 4/2010 | Ganapathi et al. | |
| 2010/0082599 A1 | 4/2010 | Graefe et al. | |
| 2010/0082602 A1 | 4/2010 | Ganapathi et al. | |

OTHER PUBLICATIONS

Bach et al., Kernel Independent Component Analysis, Journal of Machine Learning published Jul. 2002 (48 pages).

Coppin, Ben. "Artificial Intelligence Illuminated" 2004. Jones and Bartlett Publishers, Inc. (768 pages).

Ghosh et al. "Plan Selection based on Query Clustering". 2002. VLDB '02 Proceedings of the 28th international conference on Very Large Data Bases. 12 pages.

Papadomanolakis et al. "Efficient Use of the Query Optimizer for Automated Physical Design" VLDB '07 Proceedings of the 33rd international conference on Very large data bases. Sep. 2007. pp. 1093-1104.

* cited by examiner

MANAGING EXECUTION OF DATABASE QUERIES

CROSS-REFERENCE TO RELATED APPLICATIONS

This application relates to U.S. patent application Ser. No. 12/255,613, entitled "Reverse Mapping of Feature Space to Predict Execution in a Database" and filed on Oct. 21, 2008, now U.S. Pat. No. 8,275,762; U.S. patent application Ser. No. 12/242,692, entitled "Predicting Performance of Executing a Query in Isolation in a Database" and filed on Sep. 30, 2008; U.S. patent application Ser. No. 12/242,678, entitled "Characterizing Queries to Predict Execution in a Database" and filed on Sep. 30, 2008 Jul. 5, 2008 U.S. patent application Ser. No. 12/242,616, entitled "Predicting Performance of Multiple Queries Executing in a Database" and filed on Sep. 30, 2008, now U.S. Pat. No. 9,189,523, all of which are incorporated herein by reference.

BACKGROUND

Business Intelligence (BI) database systems process extremely complex queries upon massive amounts of data. This capability is important to modern enterprises, which rely upon the collection, integration, and analysis of an expanding sea of information. Analysts predict that data warehouses will grow in size and complexity.

BI queries exhibit a significant variance in response times. Most queries are known to execute in under a minute, but some small number of them require hours of execution time. According to conventional wisdom, the presence of even a few poorly written or poorly optimized queries can significantly impact the performance of a data warehouse system by taking up resources that could otherwise be used by properly functioning queries. It is not straightforward to estimate accurately how long a long-running query will take. Although customers may have service level agreements (SLAs) that spell out financial consequences, and although jobs have deadlines, the deadlines are not necessarily explicit or straightforward (or even necessarily possible) to link SLAs to deadlines.

Long running BI queries consume large resources and pose problems for administrators of databases. Administrators are regularly forced to decide which queries are hurting system performance and what action to take against such long running queries.

DETAILED DESCRIPTION

Exemplary embodiments in accordance with the present invention are directed to systems and methods for managing the execution of database queries, including queries that execute for unexpectedly long times. The systems and methods manage the execution of a set of queries in a database system that is capable of distinguishing between various types of long-running queries so as to take appropriate management actions when necessary.

Exemplary embodiments distinguish between different types of long-running queries based on their performance characteristics and take different actions to address these types of long-running queries. The likely impact upon the performance of the system is characterized for each type of long-running query. This information enables database administrators to identify long-running queries but also make informed decisions about what remedial action to take (for example, cancel or kill the query, abort the query, let the query complete, suspend the query, etc.).

Figure 1:
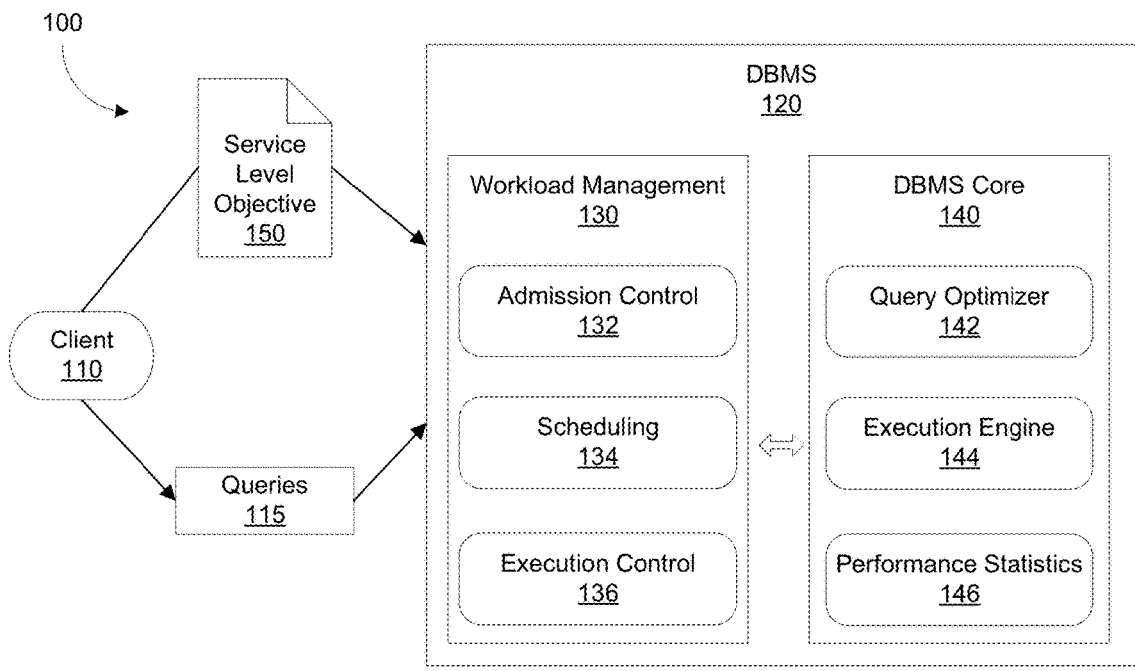
FIG. 1 is a system for managing the execution of database queries in accordance with an exemplary embodiment of the present invention.

FIG. 1 is a database system 100 for managing the execution of database queries in accordance with an exemplary embodiment of the present invention. The system generally includes a computer or client 110 that sends queries 115 to a Database Management System (DBMS) 120 which includes a workload management component 130 and a DBMS core 140. The workload management component includes plural components or modules as admission control 132, scheduling 134, and execution control 136. The DBMS core 140 includes plural components or modules as a query optimizer 142, an execution engine 144, and performance statistics 146. Further, Service Level Objectives (SLOs) 150 are coupled between the client 110 and the DBMS 120.

The workload management architecture 130 provides fundamental workload management functionality for admission control, scheduling, and execution control. In one embodiment, each of these modules 132, 134, and 136 represents a knob that can be adjusted to select from a variety of workload management policies and algorithms.

The DBMS core 140 provides core database functionality and supply information to workload management components but does not implement workload management policies.

In one embodiment, the database system executes workloads that include one or more jobs. Each job consists of an ordered set of typed queries 115 submitted by a computer or client 110, and is associated with one or more Service Level Objectives (SLOs). Each query type maps to a tree of operators, and each operator in a tree maps in turn to its resource costs.

Policies of the admission control 132 determine the submission of queries 115 to the execution engine 144 that executes the submitted queries. The admission control 132 performs three functions in workload management. First, when a new job arrives, admission control 132 evaluates the DBMS's multiprogramming level, and either submits or enqueues each of the job's queries. Second, the architecture is configurable to support multiple admission queues. Policies of the admission control 132 regulate the distribution of queries among these queues, for example adding queries to queues based on estimated cost or dominant resource. Third, when the execution engine 144 has finished processing a query, admission control 132 selects the next query for execution. In one embodiment, this selection is performed by evaluating the amount of work waiting in each queue (if there are multiple queues), and selecting the first query from the queue with the most work remaining, or using another selection scheme (for example, one based on priority, job type, first-in-first-out, FIFO, etc.).

Once queries have been enqueued, the policies of the scheduler 134 determine the ordering of the queries within a queue (for example, by estimated cost). Policies of the execution control 136 then govern the flow of the running system. As queries execute, the execution control 136 uses runtime statistics to identify problems such as overload situations or queries that are unexpectedly long-running. The execution control 136 then invokes appropriate policies to address these problems. For each executing query, the execution control 136 can monitor various metrics, such as a number of cancellations (i.e., a count of a number of times an individual query is killed), progress (i.e., a ratio of monitored to expected work terms of resource utilization), resource contention (i.e., number of queries that are competing with a query for resources), and database time (i.e., time a query is executing in the database, as opposed to waiting in a queue).

The control knobs of the workload management component 130 can be set to provide policies and corrective actions for long-running queries. The policies are the settings for the admission control 132, scheduling 134, and execution control 136. The corrective actions are remedial steps taken by the execution control 136 for a given query (for example, an identified hog, runaway, slow, buggy, or starving query).

For each query executing in the database, exemplary embodiments track various parameters or characteristics with respect to time. By way of example, exemplary embodiments track estimated execution time, elapsed time, and actual consumed execution time.

The estimated execution time represents the amount of execution time that the query optimizer 142 estimates is necessary to execute this query. In one embodiment, this estimation is provided based on the query executing in isolation. Alternatively, if the query optimizer provides estimates in terms of cardinalities instead of execution time, embodiments also estimate the time needed to process a given tuple. This estimate is then used to translate from cardinality to execution time estimates.

The elapsed time represents the amount of time that the query has been running. This time can also be described as the "wall clock time" for the query. The consumed execution time represents the amount of execution time that the query has consumed thus far.

Exemplary embodiments also define a threshold that identifies long-running queries. As used herein, a query is "long-running" when it has an elapsed time that exceeds this threshold.

These different parameters (i.e., long-running query threshold, estimated elapsed time, actual elapsed time, "fair" resource usage, actual resource usage, and progress) are used to build and define a taxonomy of query performance problems. For example, exemplary embodiments identify and distinguish between different types of long-running queries. These types include queries with the following exemplary nomenclature:

(1) "heavy" queries: Queries that consume a large, but expected and fair share amount of system resources and are making good progress.
(2) "hog" queries: Queries that consume an unfairly large, but expected, amount of system resources and are making good progress.
(3) "runaway" queries: Queries that consume an unexpectedly large amount, but still a fair share, of system resources and are making good progress.
(4) "surprise-hog" queries: Queries that make good progress and consume an unexpectedly-large and unfairly large share of system resources, potentially depriving other queries of resources.
(5) "starving" queries: Queries that take an unexpectedly long time to execute, but consume less than their fair share of resources and are making poor progress because of resource contention with other queries that are taking more than their fair share of resources.
(6) "buggy" queries: Queries that take an unexpectedly long time to execute and are not being deprived of their fair share of resources, but consume fewer resources than expected and are making poor progress because of a problem with the database system itself (e.g., a poorly implemented query operator, or an unrealistically high multi programming level (MPL)).
(7) "overload" queries: Queries that are not being deprived of their fair share of resources, but take an unexpectedly long time to execute and are making poor progress because of heavy system load.

Based on the developed taxonomy, one exemplary method first determines whether or not a query is long-running. A check or verification is then made as to whether the behavior of the long-running query is expected and/or using large amounts of system resources. Processing time (CPU time) is an example of a proxy for resource usage. Any query that performs a relatively large amount of disk Input/Output (I/O) or message transfer is also likely to use large CPU time processing the bytes read or transferred.

By way of example, heavy queries take a long time, but predictably so and allow other queries to make progress. Hog queries are also predictably long, but use more than their share of the resources. They can be scheduled when they are least likely to interfere with other queries. Runaway and surprise-hog queries behave just like heavy and hog queries—but without warning. They are the most likely to cause problems for other concurrent queries and the most important to catch. Killing (and possibly rescheduling) runaway and surprise-hog queries has the most impact on the completion time of the other queries in the workload. Starving queries are the ones impacted by hog and surprise-hog queries: they ought to be short, but are taking a long time because the hog queries do not leave them enough resources. Starving queries that are killed and restarted when there is less contention will run faster. Overload is a property of the entire system rather than a single query. It describes a system that just does not have enough resources for the current MPL, even when all of the queries are supposed to be short. There are too many queries executing concurrently and so none of them get enough resources to make reasonable progress. Running those queries at the same MPL at another time is unlikely to change their performance. The best solution is to reduce the MPL.

Figure 2:
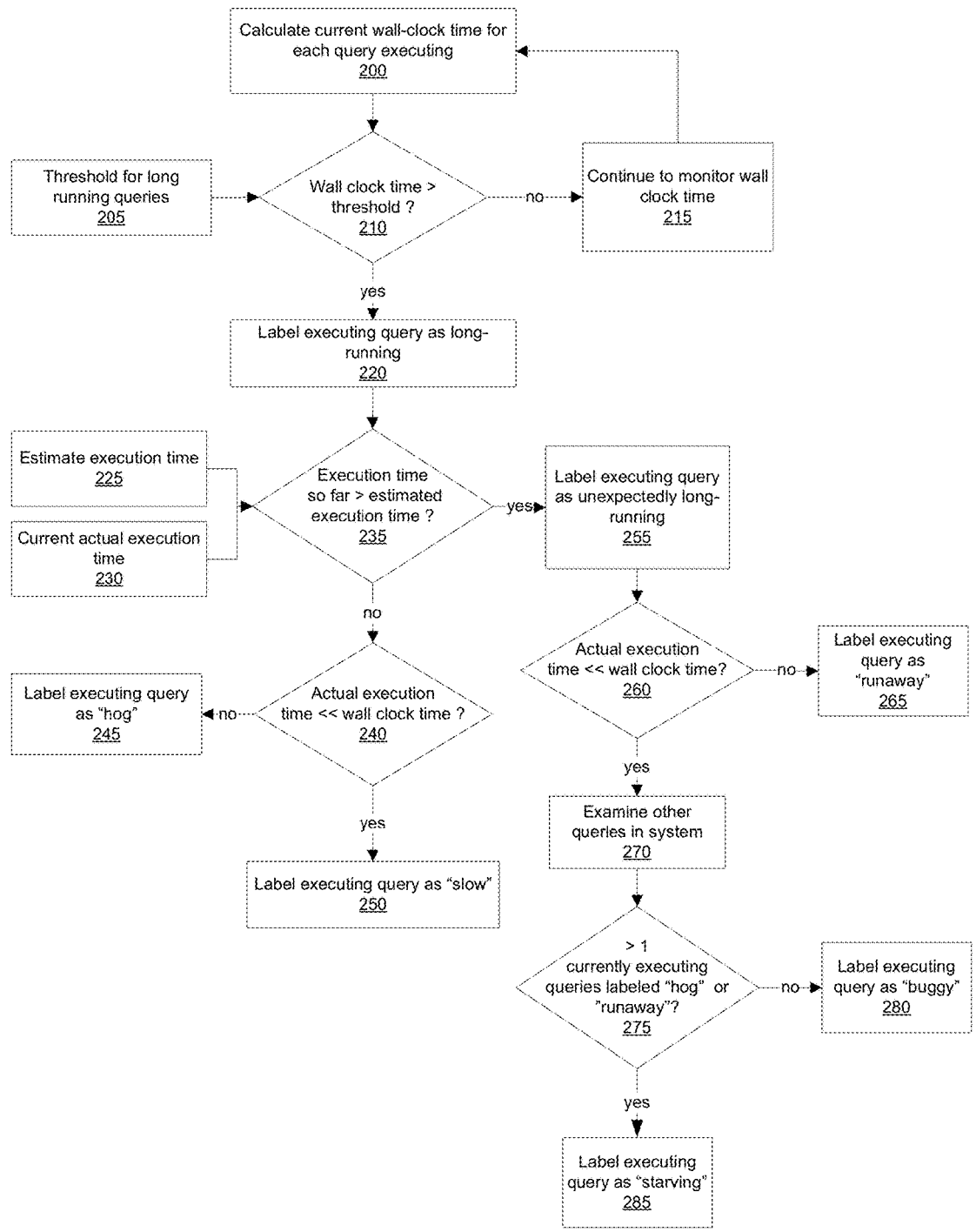
FIG. 2 is a flow diagram for categorizing long-running database queries that are executing in accordance with an exemplary embodiment of the present invention.

FIG. 2 is a flow diagram for categorizing long-running database queries that are executing in accordance with an exemplary embodiment of the present invention.

According to block 200, a calculation is made of the current wall-clock time for each query that is executing in the database. In other words, determine the elapsed time or amount of time that each query has been running.

According to block 205, one or more thresholds are defined for long-running queries. By way of example, when the elapsed time of the threshold is exceeded, then the executing query is deemed to be long-running.

In addition to defining long-running queries and providing numerical values for the corresponding thresholds, definitions and/or parameters from the taxonomy are also input into the method. As noted above, such parameters include, but are not limited to, estimated execution time, actual execution time, elapsed time, and classifications for long-running queries (for example, hog, runaway, starving, buggy, and slow).

According to block 210, a determination is made as to whether the wall clock time is greater than a threshold. If the answer to this question is "no" then flow proceeds to block 215. Here the wall clock time is continued to be monitored (for example, continuously or periodically), and flow proceeds back to block 200. If the answer to the question is "yes" then flow proceeds to block 220. Here, the query is labeled as being long-running since the wall clock time is greater than a predetermined threshold value (for example, a numerical value, a percentage, etc.).

Various different types of long-running queries are defined (for example, hog, runaway, starving, buggy, and slow). The remedial action (if any) depends on the type of long-running query that is identified. As such, the next portion of the method determines or identifies which type of long-running query is executing.

According to block 225, an estimate is provided for the execution time. In one embodiment, the query optimizer estimates the time necessary to execute this query.

According to block 230, input of the current actual execution time is provided. This time represents the amount of execution time that the query has consumed thus far.

According to block 235, a question is asked whether the execution time so far is greater than the estimated execution time. In other words, a determination is made as to whether the actual execution time for the currently executing query is greater than the predicted or estimated execution for the query before execution commenced.

If the answer to the question in block 235 is "no" then flow proceeds to block 240. Flow in this direction means that the actual execution time of the running query is less than the estimated execution time.

At block 240, a question is asked whether the actual execution time is much less than the wall clock time. If the answer to this question is "yes" then flow proceeds to block 245 where the query is labeled as being a hog. Hog queries are predictable in that they take a long time to execute and utilize a relatively large amount of resources (for example, CPU resources).

If the answer to the question in block 240 is "no" then flow proceeds to block 250 where the query is labeled as being slow. Slow queries are predictable in that they take a long time to execute and utilize a relatively small amount of resources as compared to resource utilization of hog queries.

Going back to block 235, if the answer to the question is "yes" then flow proceeds to block 255. Flow in this direction means that the actual execution time of the running query is greater than the estimated execution time. Queries in these categories are labeled as being unexpectedly long-running queries (for example, include one of runaway, buggy, or starving).

According to block 260, a question is asked whether the actual execution time for the unexpectedly long-running query is much less than the wall clock time. If the answer to this question is "no" then flow proceeds to block 265 and the query is labeled as being a runaway. Runaway queries behave like hog queries (i.e., execute with a long time and consume large resources) but have no warning because they are unexpected.

If the answer to the question in block 260 is "yes" then flow proceeds to block 270. Here, the query can be either buggy or starving. To determine how to label the query under examination, other currently executing queries in the system are examined.

Flow then proceeds to block 275 where a question is asked whether more than one currently executing query has a label of hog or runaway. In other words, another high resource query can simultaneously be executing with the query under examination.

If the answer to the question is "no" then flow proceeds to block 280, and the query is labeled as being buggy. Buggy queries take an unexpectedly long time to execute but consume fewer resources than expected due to a problem with the database system (for example, a poorly implemented query operator).

If the answer to the question is "yes" then flow proceeds to block 285, and the query is labeled as being starving. Starving queries take an unexpectedly long time to execute but consume fewer resources than expected because of competition or contention for another simultaneously executing query, such as a hog query or runaway query.

Once a long-running query is identified various actions can be taken to manage a running workload of queries. These actions include execution control actions such as kill (i.e., stop a running query and free resources consumed by the query), stop (i.e., stop a running query, return partial results to the requester, and free resources consumed by the query), resubmit (i.e., restart a killed query), suspend (i.e., save current state of an executing query and free resources), resume (i.e., restore state of a suspended query and resume execution), hold (i.e., do not admit new queries to the database system), and release (i.e., resume admitting new queries to the database), as well as admission control and scheduling actions such as restricting the admission or scheduling of new queries so as not to exacerbate a system overload situation.

Once a long-running query is identified, the particular action taken against the query depends on user defined parameters. As one example, a database administrator (DBA) can decide to input the following parameters into the database system: Kill starving or buggy queries if they run for longer than 120% of the expected execution time and are less than 80% complete. The killed queries can be immediately resubmitted to the database system.

As another example, runaway queries are not executed simultaneously with other queries. Since the objective is to optimize the flow time of the interactive job, one embodiment identifies and removes the batch runaway queries from the job. For identifying runaway queries, if a query consumes significantly more resources in relation to the others over a longer period of time, the query is removed from the system.

Exemplary embodiments support plural actions for moving a runaway query out of the way. For instance, the query is killed and not resubmitted. In this case an administrator or system can identify the cause of the problem before rerunning the query. Alternatively, the administrator or system kills the query and resubmits each of the killed queries sequentially after the jobs are complete. As another alternative, the database administrator or system suspends the problem queries and resumes them one after another after completing the other jobs.

Exemplary embodiments are not limited to any particular type of remedial action. By way of example, the admission control component (see FIG. 1) can determine whether newly arriving queries are admitted to the system to prevent the database system from being overloaded. Various policies can be set to provide such limits, such as providing an upper limit on a number of queries allowed to run concurrently, an upper limit on a number of concurrent users of the system, an upper limit for system resource usage, and an upper limit on a number of concurrent queries that access certain database objects (for example, views, indexes, and tables).

Optimizer costs and CPU time can also be used to prevent long-running queries from running in the system. For example, queries are rejected that have an optimizer cost exceeding a threshold specified by the DBA. Other admission controls can also be implemented with respect to long-running queries, such as no action (let the query execute to completion), warn (print or send a message to a log while the query continues), stop (stop processing the query and return results), kill (abort the query and return an error), and reprioritize (change the priority of the query).

Figure 3:
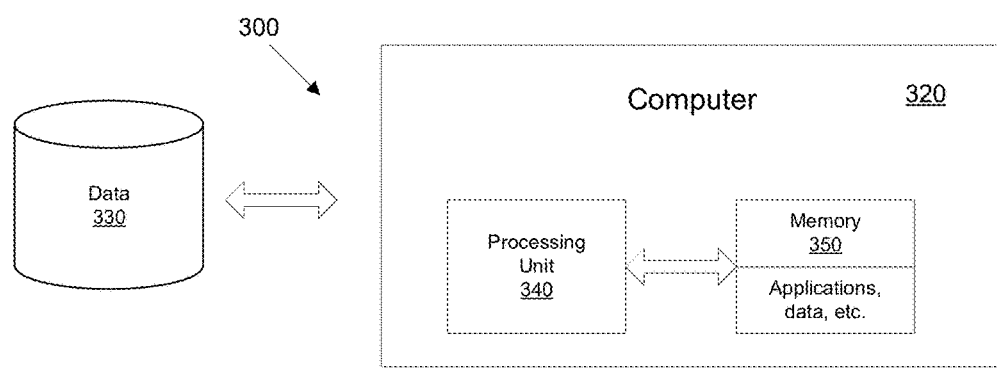
FIG. 3 is a block diagram of an exemplary computer system in accordance with an embodiment of the present invention.

Embodiments in accordance with the present invention are utilized in or include a variety of systems, methods, and apparatus. FIG. 3 illustrates an exemplary embodiment as a computer system 300 for being or utilizing one or more of the computers, methods, flow diagrams and/or aspects of exemplary embodiments in accordance with the present invention.

The system 300 includes a computer system 320 (such as a host or client computer) and a repository, warehouse, or database 330. The computer system 320 comprises a processing unit 340 (such as one or more processors or central processing units, CPUs) for controlling the overall operation of memory 350 (such as random access memory (RAM) for temporary data storage and read only memory (ROM) for permanent data storage). The memory 350, for example, stores applications, data, control programs, algorithms (including diagrams and methods discussed herein), and other data associated with the computer system 320. The processing unit 340 communicates with memory 350 and data base 330 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

Exemplary embodiments do not require any expensive statistics to be maintained and are more flexible than setting absolute limits. By using the amount of query execution time in lieu of input and output cardinalities, expensive ongoing statistics are avoided. Furthermore, by considering the amount of progress done in terms of elapsed time, estimated execution time, and actual execution time, exemplary embodiments identify problem queries based on their performance characteristics, as opposed to strictly by the amounts of resources used.

Definitions

As used herein and in the claims, the following words have the following definitions:

The terms "automated" or "automatically" (and like variations thereof) mean controlled operation of an apparatus, system, and/or process using computers and/or mechanical/electrical devices without the necessity of human intervention, observation, effort and/or decision.

A "database" is a structured collection of records or data that are stored in a computer system so that a computer program or person using a query language can consult it to retrieve records and/or answer queries. Records retrieved in response to queries provide information used to make decisions. Further, the actual collection of records is the database, whereas the DBMS is the software that manages the database.

A "database administrator" or "DBA" is a person who defines or manages a database or controls access to the database.

A "database management system" or "DBMS" is computer software designed to manage databases.

The term "elapsed time" or "wall clock time" means the actual time as measured by a clock that the query has been executing or running.

The term "execution time" means the amount of time the processor or CPU is actually executing instructions. During the execution of most programs, the CPU sits idle much of the time while the computer performs other tasks, such as fetching data from the keyboard or disk, or sending data to an output device. The execution time is, therefore, generally less than the wall-clock time (i.e., the actual time as measured by a clock that the query has been running) and includes the time a query is executing in the database and not the time waiting in a queue.

The term "long-running query" means a query executing or running for an elapsed time that exceeds a threshold.

The term "Service Level Objective" or "SLO" is a key element of a Service Level Agreement (SLA) between a Service Provider and a customer. SLOs are agreed as a means of measuring the performance of the Service Provider and are outlined as a way of avoiding disputes between the two parties based on misunderstanding. The SLA is the contract or agreement that specifies what service is to be provided, how it is supported, times, locations, costs, performance, and responsibilities of the parties involved. SLOs are specific measurable characteristics of the SLA such as availability, throughput, frequency, response time, or quality. Further, the SLOs can include one or more quality-of-Service (QoS) measurements that are combined to produce the SLO achievement value.

A "workload" is a set of queries used for the data warehouse.

In one exemplary embodiment, one or more blocks or steps discussed herein are automated. In other words, apparatus, systems, and methods occur automatically.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   distinguishing between different types of long-running queries executing in a database system comprising a computer using a taxonomy of query performance problems, the taxonomy comprising a threshold, an estimated execution time calculated by a query optimizer for a query, an actual execution time of a query, and an elapsed time, wherein distinguishing between the different types of long-running queries using the taxonomy comprises:
      identifying a respective query as a long-running query in response to an elapsed time for the respective query exceeding the threshold,
      identifying a first long-running query of the long-running queries as a first type long-running query responsive to determining that an actual execution time of the first long-running query is less than an estimated execution time calculated by the query optimizer for the first long-running query and is less than an elapsed time of the first long-running query but greater than a specified time that is below the elapsed time of the first long-running query, and
      identifying a second long-running query of the long-running queries as a second, different type long-running query responsive to determining that an actual execution time of the second long-running query is greater than an estimated execution time calculated by the query optimizer for the second long-running query and is less than a specified time that is below an elapsed time of the second long-running query;
   implementing, by the database system, a remedial action for at least one of the long-running queries.

2. The method of claim 1, wherein the remedial action comprises aborting execution of a long-running query of the different types of long-running queries.

3. The method of claim 1, wherein implementing the remedial action comprises:
   implementing a different remedial action for each of the different types of long-running queries.

4. The method of claim 1 wherein the different types of long-running queries comprise hog queries, runaway queries, starving queries, and buggy queries.

5. The method of claim 1, wherein the second type long-running query is identified as a buggy long-running query responsive to determining that at least one other long-running query of the first type long-running query is currently executing in the database system, and
   wherein the second type long-running query is identified as a starving long-running query responsive to determining that no long-running query of the first type long-running query is currently executing in the database system.

6. The method of claim 1, wherein distinguishing between the different types of long-running queries further comprises:
   identifying a third long-running query of the long-running queries as a third type long-running query different from the first type long-running query and the second type long-running query, responsive to determining that an actual execution time of the third long-running query is greater than an estimated execution time calculated by the query optimizer for the third long-running query and is less than an elapsed time of the third long-running query, but is greater than a specified time that is below the elapsed time of the third long-running query.

7. The method of claim 6, wherein the third type long-running query is a query that consumes a large but a fair share amount of system resources and is making progress at greater than a target level.

8. The method of claim 7, wherein the second type long-running query consumes less than a target level of the system resources.

9. The method of claim 1, wherein determining that the actual execution time of the first long-running query is less than the elapsed time of the first long-running query but greater than a specified time that is below the elapsed time of the first long-running query is a determination that the actual execution time of the first long-running query is not much less than the elapsed time of the first long-running query, and
   wherein determining that the actual execution time of the second long-running query is less than the elapsed time of the second long-running query and less than a specified time that is below the elapsed time of the second long-running query is a determination that the actual execution time of the second long-running query is much less than the elapsed time of the second long-running query.

10. A non-transitory computer readable storage medium having instructions for causing a computer to:
    distinguish between different types of long-running queries simultaneously executing in a database system using a taxonomy of query performance problems, the taxonomy defining whether behavior of the long-running queries is expected, the taxonomy comprising a threshold, an estimated execution time calculated by a query optimizer for a query, an actual execution time of a query, and an elapsed time, wherein distinguishing between the different types of long-running queries using the taxonomy comprises:
       identifying a respective query as a long-running query in response to an elapsed time for the respective query exceeding the threshold,
       identifying a first long-running query of the long-running queries as a first type long-running query responsive to determining that an actual execution time of the first long-running query is less than an estimated execution time calculated by the query optimizer for the first long-running query and is not much less than an elapsed time of the first long-running query, and identifying a second long-running query of the long-running queries as a second, different type long-running query responsive to determining that an actual execution time of the second long-running query is greater than an estimated execution time calculated by the query optimizer for the second long-running query and is much less than an elapsed time of the second long-running query; and take a remedial measure for at least one of the different types of long-running queries.

11. The non-transitory computer readable storage medium of claim 10, wherein the first type long-running query is a query that consumes a large but expected amount of system resources, and wherein the second type long-running query is a query that consumes less than a fair share of the system resources and is making poor progress because of system resource contention with other queries.

12. The non-transitory computer readable storage medium of claim 10, wherein the second type long-running query is a query that consumes fewer system resources than expected because of a problem with the database system.

13. The non-transitory computer readable storage medium of claim 10, wherein the taxonomy is developed for different parameters.

14. The non-transitory computer readable storage medium of claim 10, wherein the second type long-running query is identified as a buggy long-running query responsive to determining that at least one other long-running query of the first type long-running query is currently executing in the database system, and wherein the second type long-running query is identified as a starving long-running query responsive to determining that no long-running query of the first type long-running query is currently executing in the database system.

15. The non-transitory computer readable storage medium of claim 10, wherein distinguishing between the different types of long-running queries further comprises:

identifying a third long-running query of the long-running queries as a third type long-running query different from the first type long-running query and the second type long-running query, responsive to determining that an actual execution time of the third long-running query is greater than an estimated execution time calculated by the query optimizer for the third long-running query and is not much less than an elapsed time of the third long-running query.

16. A database system, comprising:
a processor; and
a storage medium storing instructions executable on the processor to:
identify queries that execute in the database system as long-running queries responsive to respective elapsed times of the queries exceeding a threshold;
distinguish between different types of the long-running queries executing in the database system using a taxonomy of query performance problems, the taxonomy comprising the threshold, an estimated execution time calculated by a query optimizer for a query, and an actual execution time of a query, wherein distinguishing between the different types of the long-running queries using the taxonomy comprises:

identifying a first long-running query of the long-running queries as a first type long-running query responsive to determining that an actual execution time of the first long-running query is less than an estimated execution time calculated by the query optimizer for the first long-running query and is less than an elapsed time of the first long-running query but greater than a specified time that is below the elapsed time of the first long-running query, and identifying a second long-running query of the long-running queries as a second type long-running query different from the first type long-running query, responsive to determining that an actual execution time of the second long-running query is greater than an estimated execution time calculated by the query optimizer for the second long-running query and is less than an elapsed time of the third long-running query, but is greater than a specified time that is below the elapsed time of the second long-running query; and take a remedial action for a given long-running query of the long-running queries, the remedial action selected from among canceling the given long-running query, aborting the given long-running query, suspending the given long-running query, or letting the given long-running query complete.

17. The database system of claim 16, wherein distinguishing between the different types of the long-running queries further comprises:

identifying a third long-running query of the long-running queries as a third type long-running query different from the first type long-running query and the second type long-running query, responsive to determining that an actual execution time of the third long-running query is greater than an estimated execution time calculated by the query optimizer for the third long-running query and is below a specified time that is below an elapsed time of the third long-running query.

18. The database system of claim 17, wherein the third type long-running query is identified as a buggy long-running query responsive to determining that at least one other long-running query of the first type long-running query is currently executing in the database system, and wherein the third type long-running query is identified as a starving long-running query responsive to determining that no long-running query of the first type long-running query is currently executing in the database system.

19. The database system of claim 16, wherein the second type long-running query is a query that consumes a large but a fair share amount of system resources and is making progress at greater than a target level.

* * * * *